(12) United States Patent
Maupetit

(10) Patent No.: US 7,435,469 B2
(45) Date of Patent: Oct. 14, 2008

(54) RIGID ELEMENT MADE OF A POLYMER-RESIN BASED MATERIAL INTENDED TO BE JOINED TO A SUPPORT STRUCTURE MADE OF A POLYMERIC MATERIAL

(75) Inventor: Jérôme Maupetit, Saint Martin de Valamas (FR)

(73) Assignee: Chomarat Composites, Paris (FR)

( * ) Notice: Subject to any disclaimer, the term of this patent is extended or adjusted under 35 U.S.C. 154(b) by 0 days.

(21) Appl. No.: 11/619,374

(22) Filed: Jan. 3, 2007

(65) Prior Publication Data

US 2007/0155270 A1 Jul. 5, 2007

(30) Foreign Application Priority Data

Jan. 4, 2006 (FR) .................................. 06 50028

(51) Int. Cl.
*B32B 23/02* (2006.01)

(52) U.S. Cl. ........................ 428/192; 428/299.1; 442/21
(58) Field of Classification Search ................... 442/21, 442/27, 52, 58; 428/299.4, 192, 299.1
See application file for complete search history.

(56) References Cited

FOREIGN PATENT DOCUMENTS

| FR | 2 620 648 A1 | 3/1989 |
|----|---|---|
| WO | WO 99/41059 A1 | 8/1999 |
| WO | WO 2004/003096 A1 | 1/2004 |

*Primary Examiner*—Arti Singh
(74) *Attorney, Agent, or Firm*—Burr & Brown

(57) ABSTRACT

A rigid element (2) made of a polymer-resin-based material intended to be joined, by welding, to a support structure (3) made of a polymeric material, characterized in that it comprises a textile layer (10) including electrically conductive yarns (11, 12) and in that it has an outer layer (14) made of a material that is compatible with the material of support structure (3).

8 Claims, 1 Drawing Sheet

RIGID ELEMENT MADE OF A POLYMER-RESIN BASED MATERIAL INTENDED TO BE JOINED TO A SUPPORT STRUCTURE MADE OF A POLYMERIC MATERIAL

FIELD OF THE INVENTION

The invention relates to the field of technical textiles, more specifically textile laminates used to make composite parts.

It relates in particular to a rigid element capable of being welded onto a support structure. It refers, more especially, to the integration into this element of features that enable it to ensure welding by softening in situ of the various materials at the interface of the joint area.

DESCRIPTION OF THE PRIOR ART

Generally speaking, in order to improve the mechanical properties of a structure, it may be useful to add additional elements to it that act as stiffeners and modify the capacity of shape alteration of the main structure.

By way of example, one might mention the manufacture of skis that can be fitted with stiffeners consisting of relatively rigid elements that limit flexural deformation of the ski. Another example is the reinforcement of vehicle bodywork structures made of composite materials or the hulls of boats or even the reinforcement of structures in offshore applications, especially pipes or tubes.

Integrating these stiffening elements directly into the main structure may make manufacturing processes excessively complex or even make them impossible in certain cases. In fact, the integration of stiffening ribs during actual fabrication of composite parts may excessively complicate the shape of the mould or force designers to locate stiffeners in areas that are not necessarily optimal for this purpose.

Another technique in order to fit this type of stiffener is to use bonding. Adhesives of the isocyanate type can be used in order to react with resins that constitute the outer layers of the stiffening element and the support structure. Nevertheless, the use of this type of adhesive has a certain number of disadvantages. In fact, isocyanate compounds react chemically with the resins of these layers and they must therefore be formulated so as to avoid the occurrence of parasitic reactions which would degrade the rest of the structure or the stiffener. In addition and above all, bonding requires an operation to deposit the adhesive and this is awkward to the extent that this requires positional accuracy and working in a dust-free atmosphere.

The use of bonding films interposed between the parts that are to be joined has been proposed in Documents FR 2,620,648 and WO 2004/003096, the adhesives being reactivated by exposure to a heat source consisting of a resistive electrical device built into or associated with the bonding film. The flow of an electric current through this resistive device produces heat that is transferred to the film of adhesive that is thus reactivated. The obvious fitting and positioning problems this involves make these processes difficult to use on an industrial scale.

One object of the invention is to provide a way of joining an element to a support made of a polymeric material which enables simple positioning without involving operating conditions that are difficult to implement industrially.

Another object of the invention is to make it possible to join additional elements that may have an extremely wide variety of shapes whilst ensuring homogeneous adhesion properties over the entire contact surface between the two parts.

SUMMARY OF THE INVENTION

The invention therefore relates to a rigid element made of a polymer-resin-based material intended to be joined to a support structure also made of a polymeric material.

According to the invention, this element is characterised by the fact that it comprises a textile layer that includes electrically conducting yarns. This textile layer is covered by an outer layer made of a material that is compatible with the material of the support structure.

In other words, the invention involves using an element that includes a textile laminate, the core of which is electrically conductive, so that a current can be passed through the element when it is fitted on the support. Because of the Joule effect, passing an electric current through the textile core causes heat dissipation that softens adjacent materials, especially the outer layer of the rigid element, but also, to a lesser extent, the outer layers of the support structure. In this way, the various materials can, under the effect of pressure, mix with each other in a state approaching that of fusion and subsequently form a single homogeneous layer after cooling, thus achieving a kind of welding.

In this way, extremely homogeneous adhesion is obtained because the entire textile core dissipates a quantity of heat, Because of the chemical compatibility of the layer that covers the textile and which comes into contact with the upper layer of the support structure, there is therefore no risk of occurrence of chemical phenomena capable of degrading these various layers or even creating fragile or delaminated areas. The textile core is impregnated by the resin of the outer layer and this also makes it possible to eliminate, or at least significantly limit, the risks of delamination that are encountered in bonded assemblies. In other words, the homogeneity of the materials used and the way the contact surface is defined make it possible to obtain reproducible, reliable welding.

In practice, the textile core can be made in various ways and, in particular, be based on a warp-and-weft or non-woven fabric.

In the case of a warp-and-weft fabric, the conductive yarns may be present in only one direction of the fabric, typically in the warp direction. The conductive yarns may also be present in both the directions of the fabric so as to form a meshed grid.

Depending on the particular application and, in particular, the dimensions of the areas to be welded, the conductive yarns may account for all or some of the yarns in the warp and/or weft direction. In other words, in some cases, all the yarns in the warp and/or weft direction consist of conductive yarns. In other cases, the conductive yarns are distributed between other non-conductive yarns.

Advantageously and in practice, the conductive yarns used can be carbon-filament based with good weaveability whilst having an electrical resistivity that makes it possible to obtain a sufficient temperature increase.

This textile core is covered with an outer layer that can be produced in various ways. The outer layer can be produced by a prior operation to coat the textile core which is then integrated into the rest of the element. In this case, the coating stage allows the material of the outer layer to impregnate and penetrate the textile core.

The outer layer associated with the textile core can be obtained by laminating one or more films onto the textile core or even a fabric consisting of thermoplastic yarns. It is also possible to deposit the outer layer by powder coating or even to coat the conductive yarns individually before weaving them, and to integrate the fabric into the distinctive element.

BRIEF DESCRIPTION OF THE DRAWINGS

In order that the way in which the invention is implemented and its resulting advantages may more readily be understood, the following description is given, merely by way of example, reference being made to the accompanying drawings.

DESCRIPTION OF THE PREFERRED EMBODIMENTS

Figure 1:
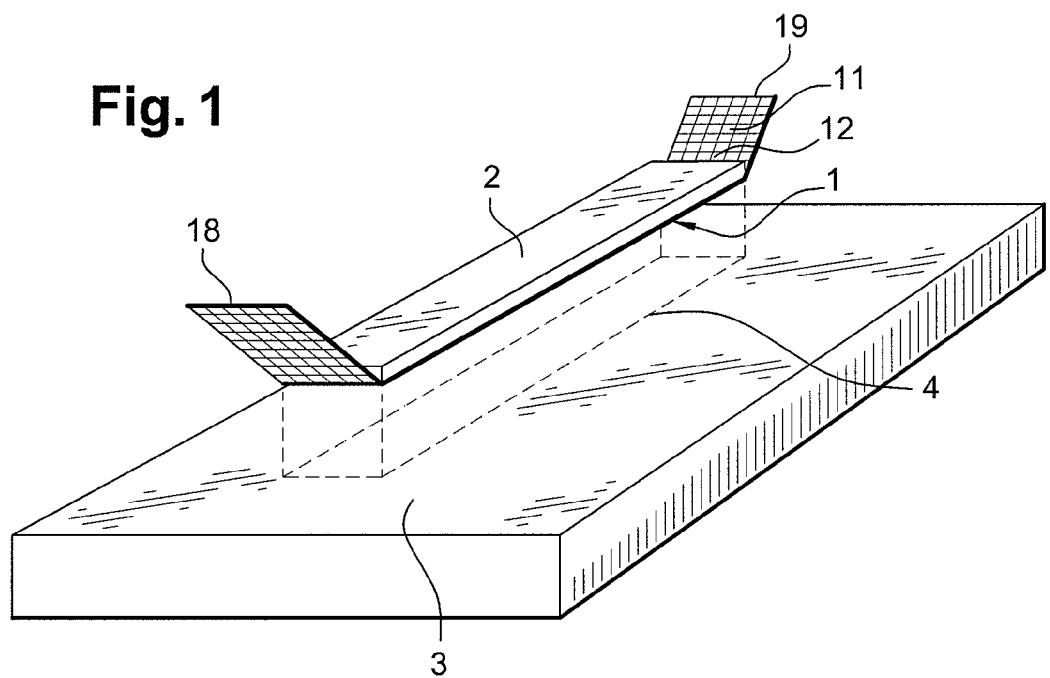
FIG. 1 is a schematic perspective view of a rigid element in accordance with the invention, shown at the time it is fitted on the support structure.

FIG. 1 illustrates the situation in which the distinctive (1) rigid element (2) is present before being welded onto a support structure (3) in a specific area (4) defined by the broken line (4).

Figure 2:
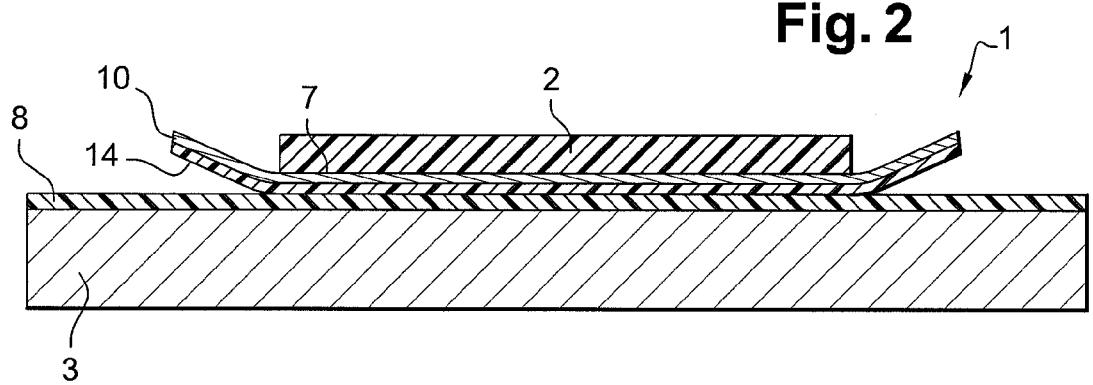
FIGS. 2 and 3 are cross-sectional views of the distinctive laminate between the support structure and the stiffening element before and after welding respectively.

Support structure (3) may be a part obtained by injection moulding, moulding or any other technique in which a resin made of a polymeric material is used in order to form at least upper layer (8) visible in FIG. 2.

Stiffening element (2) is generally made of a more rigid material. It is securely joined to support structure (3) in order to influence the latter's overall rigidity. It may typically be composite elements that include textile or even metallic reinforcing structures embedded in a thermoplastic resin.

Element (2) includes a textile-based laminate (1) intended to ensure welding onto structure (3). This laminate (1) comprises a textile core (10) which is made of yarns that are electrically conductive. Fabrics based on carbon yarns are among the materials that give good results. These carbon yarns may be present in the warp (11) and/or weft (12) of the fabric. They may be used on their own or in combination with other non-conductive yarns in order to reduce the number of carbon yarns, thus keeping down the cost of this bonding intermediary.

Typically, good results are obtained by using woven fabrics based on warp and weft carbon yarns having 12,000 filaments jointedly woven by means of a weft that includes some coated thermofusible yarns in order to fix the fabric. Such a textile has a resistance of the order of several dozen ohms between two points that are approximately 15 cm apart.

Nevertheless, other conductive filaments, especially metallic filaments, can be used. Similarly, a non-woven fabric based on a sufficient quantity of conductive filaments can be used.

According to the invention, the surface of this textile core (10) intended to come into contact with support (3) is covered with a layer (14) made of a polymeric material. This materiel is compatible with the resin of the part with which it is intended to come into contact. Here, the term "compatible" should be understood to mean the ability of the two materials to adhere to each other after having been placed in contact and been partially melted or softened by exposure to heat. Polymer materials are, obviously, compatible with themselves. Nevertheless, certain pairs of polymer materials are well known to have good adhesion to each other. Examples of different materials that are compatible include the association of ethyl vinyl acetate (EVA) with polyethylene or polypropylene or also the association of polyamide 6,6 with thermoplastic polyurethane elastomer (TPE-U).

In the case of a structure (3) based on polyamide or thermoplastic polyurethane, it may be advantageous that textile core (10) is also covered in a layer (14) of polyamide or thermoplastic polyurethane. Numerous combinations of materials may be possible depending on the composition of the elements that are to be joined.

As stated earlier, the outer layer (14) of the element may be produced either by coating or by laminating films or fabrics consisting of thermoplastic yarns. It is also possible to deposit this outer layer (14) by powder coating or by coating the conductive yarns individually. It is also possible, during a preliminary operation, to associate a stiffening element strictly speaking with a textile laminate that includes the conductive textile layer and one or more layers of polymeric materials on one and/or the other of its surfaces. These layers are chosen so that they are compatible with the surface with which they will come into contact, namely that of support (3) and that of the rest of the stiffening element on which the laminate will be spread. Is also possible to produce the distinctive stiffening element directly by moulding, by integrating the textile into the thermocompression mould.

Figure 3:
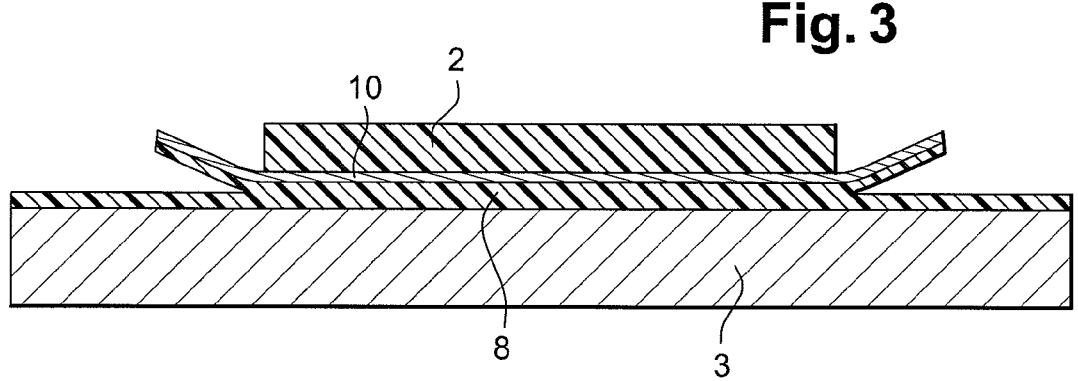

When element (2) is fitted, as shown in FIG. 1, the lower outer layer (14) comes into contact with the upper surface (8) of support structure (3). The protruding portions (18, 19) of the laminate are used as electrodes and may accommodate the connection to a voltage source or current generator. The electric current that flows through textile core (10) causes heating due to the Joule effect. This heating causes softening or even partial melting of outer layer (14) of rigid element (1) and of the corresponding surface (8) of the support structure so that, after cooling, the interface between the layers virtually disappears, as shown in FIG. 3. The period for which the electric current is applied is determined depending on the temperatures to be reached, these temperatures in turn depend on thicknesses and the materials used.

Typically, with a woven textile based on carbon yarns with 12,000 filaments, coated in polyamide, current flow for several seconds at a pressure of several bars makes it possible to achieve a temperature rise up to approximately 160° C. which is sufficient to ensure blending of the polyamide with the material of the stiffening element.

The foregoing explanations show that the laminate according to the invention makes it possible to ensure effective, homogeneous joining with a short cycle time without the need for any awkward manipulation.

The invention claimed is:

1. A rigid element adapted to be joined to a support structure made of a polymeric material, the rigid element comprising:
    a stiffening structure made of a polymer-resin-based material;
    a single textile layer contacting the stiffening structure, the textile layer including electrically conductive yarns in the form of one of a warp and weft fabric and a non-woven fabric; and
    an outer layer contacting the single textile layer, the outer layer being made of a material that is compatible with the polymeric material of the support structure,
    wherein the single textile layer includes two protruding portions extending beyond sides of the stiffening structure, the two protruding portions being electrically connected to one another directly through the electrically conductive yarns such that current passes through the textile layer between the protruding ends causing the electrically conductive yarns to be heated through resistive heating.

2. An element as claimed in claim 1, wherein the textile layer is made of a warp-and-weft fabric.

3. An element as claimed in claim 2, wherein the fabric has conductive yarns, at least in the warp direction.

4. An element as claimed in claim 1, wherein the textile layer is made of a non-woven fabric.

5. An element as claimed in claim 1, wherein the conductive yarns are based on carbon filaments.

6. An element as claimed in claim 4, wherein the outer layer is produced by coating or powder coating the textile layer.

7. An element as claimed in claim 5, wherein the outer layer is produced by laminating one or more films.

8. An element as claimed in claim 5, wherein the outer layer is produced by laminating one or more fabrics made of thermoplastic yarns.

* * * * *